3,186,142
APPARATUS FOR CONTINUOUSLY CLOSING THERMOPLASTIC CONTAINERS BY HEAT SEALING WITH THERMOPLASTIC COVERS
Detta Borgardt, Bremervorde, and Gerd Müller, Hamburg-Bahrenfeld, Germany, assignors to Bebo-Plastik G.m.b.H., Bremervorde, Germany, and Farbwerke Hoechst Aktiengesellschaft vormals Meister Lucius & Brüning, Frankfurt am Main, Germany, both companies of Germany
Filed Apr. 7, 1961, Ser. No. 101,496
Claims priority, application Germany, Apr. 8, 1960, B 57,416; May 19, 1960, B 57,926
8 Claims. (Cl. 53—373)

The present invention relates to a process and apparatus for continuously closing thermoplastic containers with thermoplastic covers by heat sealing.

It is known to close containers having the shape of a trough or cup and made of thermoplastic materials such as vinyl polymers, for example polyvinyl chloride or polystyrene, polyethylene, particularly low pressure polyethylene, polypropylene or copolymers, or of composite foils of these types made by thermal combination of several foils of these substances, by welding onto the said containers plane foils or sheets cut from the corresponding thermoplastic material. Especially in the case of polyolefins, the covers are welded on by heat and pressure, the pressure is then released and the material is allowed to cool. This mode of proceeding has the disadvantage that the container is not closed uniformly so that a relatively great proportion of the filled and closed containers has to be rejected as being of inferior quality since the weld joining the cover and the brim of the container exhibits gaps and is not tight in several places.

The present invention provides a process and apparatus for continuously closing thermoplastic containers by welding onto said containers thermoplastic covers whose shape is adapted to the shape of the container, which process and apparatus enable the aforesaid disadvantages to be avoided.

In the process of the invention, the containers to be closed are pressed by their brims, with the covers lying thereon, with a uniform pressure against a metal surface which moves at the same speed and in the same direction as the containers. The metal surface and the containers are continuously passed along a heating device which heats the metal surface to welding temperature and then, without changing or interrupting the pressure with which the containers are pressed against the metal surface, the containers and the metal surface are passed along a cooling device which cools the metal surface. The welding device and the cooling device are arranged one after the other. The containers to be sealed are conducted along beneath these devices while being pressed against the metal surface. The uniformity of this pressure is furthermore ensured by the fact that variations in the thickness of the material or in the dimensions of the containers are compensated by means of rubber supports adapted to the shape of the containers.

An especially suitable apparatus for carrying out the process of the invention comprises, in its most general form, a horizontal endless chain-type conveyor driven by rollers or sprocket wheels. Between the chains of the conveyor there are disposed conveying plates provided with appropriate openings in which the containers to be closed are suspended. The apparatus of the invention furthermore comprises a spring-mounted supporting device disposed beneath the upper part of the plate conveyor and an endless metal band which is arranged in parallel with the plate conveyor and driven by conveying rollers and against which the containers with the covers lying thereon are pressed. The lower part of the endless metal band is at a small distance from the upper part of the plate conveyor moving in the same direction. Between the upper and lower parts of the endless metal band, a heating unit and a cooling unit are arranged to heat or cool the endless metal band over a part of its length.

The heating unit and the cooling unit by which the metal band is heated to welding temperature or cooled may be disposed side by side or one above the other. In the latter case, the upper part of the endless metal band is advantageously heated by the heating unit and the lower part cooled by the cooling unit.

The containers are pressed by their brims against the endless metal band by a spring-mounted supporting device disposed below the upper part of the plate conveyor. The supporting device consists advantageously of two fiber rails or rails of similar material, for example light metal or another plastic material, the rails being connected over their entire length to two rigid supporting rails by pressure springs.

Since, in the case of containers filled with liquid goods, for example fish marinade, the joining surfaces of the container brim and the cover may be wetted with portions of the liquid which may contain, for example, acetic acid or sugar, it is necessary in special cases to adapt the closing apparatus in an especially elastic manner to the conditions prevailing in the case of each individual container, in order to press together the brim of the container and the cover so perfectly in the welding and cooling phases that a tight closure is ensured over the entire circumference of the container.

It is particularly advantageous to design the spring-mounted supporting device so that it can be even more modulated. For this purpose, the spring-mounted supporting device disposed below the upper part of the plate conveyor is composed of a plurality of separate guide shoes which are arranged horizontally one beside the other and connected to a rigid supporting rail by pressure springs. The guide shoes each of which is spring-mounted convey the pressure to the conveying plates of the plate conveyor via the roller chain links of the connecting chain and compensate any irregularity in the machine material or sheet material owing to their small dimensions and free movability. In general, the length of the guide shoe should be smaller than the length of the container and should be, for example, half the length of the container, to ensure fully elastic springing and consequently a uniform pressure.

In this constructional form of the plate conveyor, the endless chain of the plate conveyor serves not only as connecting and conveying chain but, with the roller chain links, also as pressure transmitter. The pressure rails and the high sliding friction conditioned thereby are, therefore, replaced by the smaller friction of the rollers.

The effect of the last-mentioned type of the spring-mounted supporting device may also be obtained by using a supporting device which consists of a plurality of base plates which are connected, on the one hand, to the lower side of the conveying plates by pressure springs and, on the other hand, directly to the chains of the plate conveyor.

It is also possible to replace the metal band by a plate conveyor which consists of two endless conveying chains and a plurality of metal frames which are disposed between the said conveying chains and secured to the chain links. In this mode of construction, the plate conveyor containing the containers to be closed, and the metal frame conveyor whose plates are heated to welding temperature and then cooled again are centrally controlled and driven synchronously in a ratio of 1:1 so that a container to be closed and a metal frame (welding frame)

are situated one above the other in a manner such that the edges are exactly opposite each other, meet in an exact manner at the point of contact of the two conveyors and are conducted in this exactly opposite position through the whole apparatus. Owing to the good caloric conductibility of the metal plates (welding frames), which are, for example, of copper, the heating unit may be arranged above the cooling unit, instead of beside the latter, so that the entire free length of the upper part of the welding frame conveyor is heated by the heating unit and the entire free length of the lower part of it is cooled by the cooling unit. In this case a correspondingly stronger heating is necessary, however, in order to achieve that the welding frames are still at the necessary welding temperature when they pass from the upper to the lower part of the conveyor since they are cooled by the cooling unit in the lower part of the conveyor already after a relatively short distance. The heat absorbed by the welding frames in the zone below the heating unit is then sufficient to ensure a perfect weld between the container and the cover, while the container with the cover welded thereon and the metal frame are then conducted along under pressure below the cooling unit. This mode of construction permits correspondingly shorter longitudinal dimensions of the apparatus, that is shorter endless bands or chains and also a higher speed of the conveyors.

To compensate differences in the sheet material, it is also advantageous to provide the conveying plates with rubber supports which are adapted to the shape of the container and on which the brim of the container rests.

An apparatus suitable for use in carrying out the process of the invention is illustrated diagrammatically by way of example in the accompanying drawings.

Figure 1:
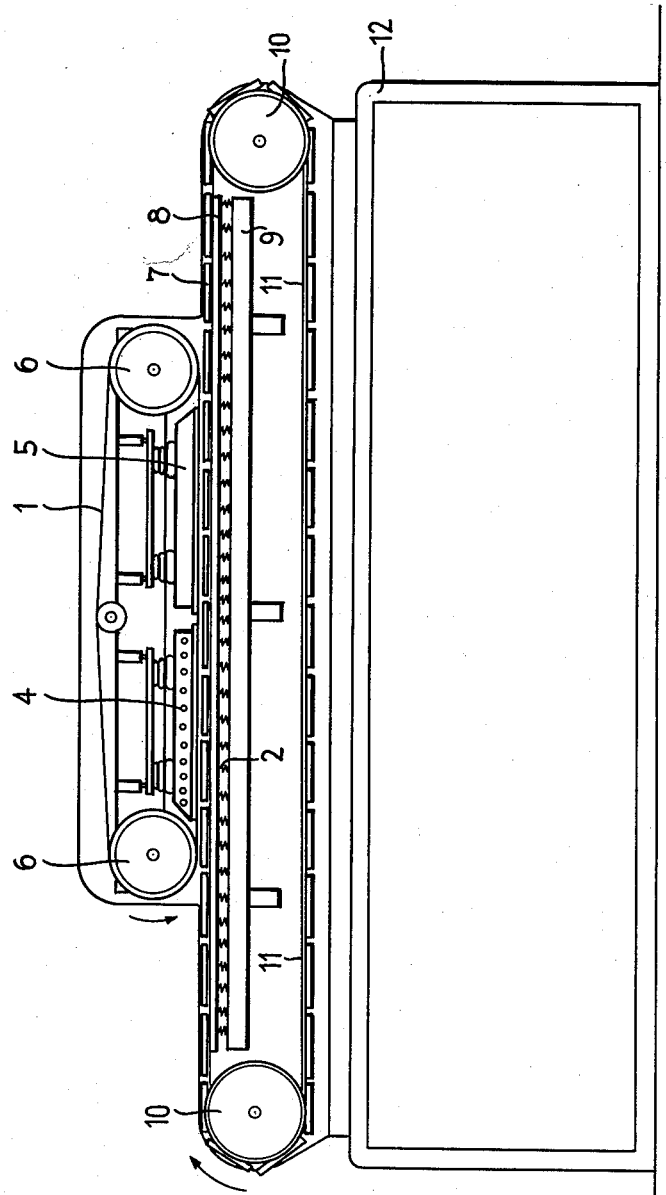
FIGURE 1 is a side view of one embodiment of the apparatus of the present invention.
Figure 2:
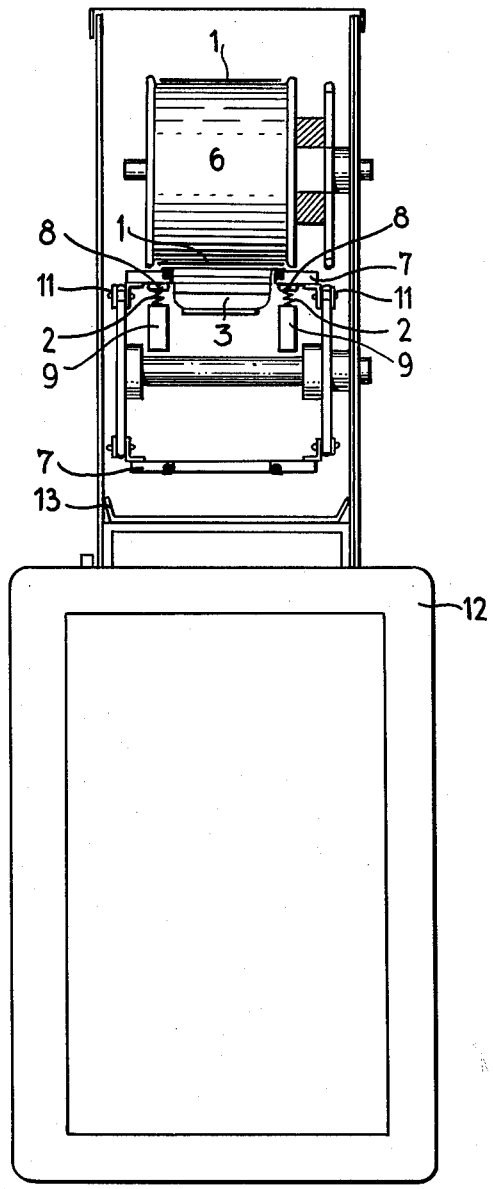
FIGURE 2 is a front end view of the embodiment of FIGURE 1.

Referring to the drawings, FIG. 1 is a side elevation and FIG. 2 a front view of a closing apparatus with endless metal band 1. On engine pedestal 12, driven rollers or sprocket wheels 10 are pivoted over which run two endless chains 11 between which conveying plates 7 are disposed which are provided with openings for suspending containers 3 to be sealed, endless chains 11 and conveying plates 7 forming the plate conveyor. Above the plate conveyor, two pivoted driven conveying rollers 6 are disposed over which runs endless metal band 1. The latter transfers the heat supplied by heating unit 4 which is disposed between the upper and lower parts of metal band 1 and then the cold supplied by cooling member 5 which is arranged beside heating unit 4 to the upper surfaces of containers 3 with the covers lying thereon, the containers with the covers thereon being pressed against metal band 1 by the plate conveyor.

The upper part of the plate conveyor is supported along the longitudinal sides by fiber rails 8 which are connected to two rigid supporting rails 9 by pressure springs 2 in order to exert an intense uniform pressure by which the upper sides of containers 3 are suspended in the plate conveyor and on which the covers are placed, are pressed against metal band 1.

Numeral 13 designates a drip pan for any liquid which, when containers filled with liquid are suspended in the plate conveyor, may be spilled and run into the plate conveyor and trickle down.

Figure 3:
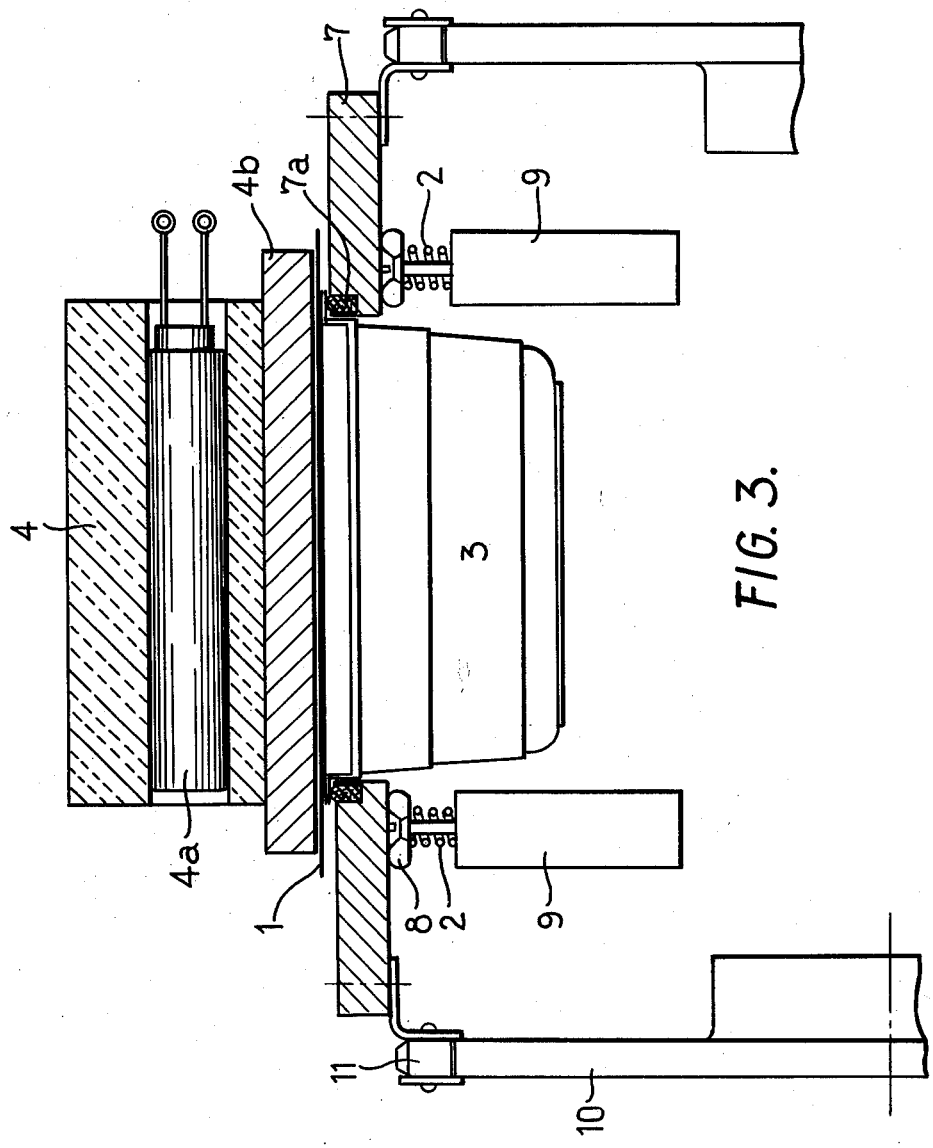
FIGURE 3 is a section on an enlarged scale taken through the heating zone of FIGURE 1.

FIG. 3 is an enlarged cross-sectional view of a part of the apparatus and shows the arrangement of the spring-mounted supporting device. The elevation is taken in the heating zone. The heating unit proper is designated by 4, the heating cartridges are designated by 4a and the heat contact plate which transmits the heat to metal band 1 running along beneath the said heat contact plate is denoted by 4b. The rubber supports in conveying plates 7, which serve to compensate any differences in the thickness of the sheet material are represented at 7a.

The apparatus of FIGS. 1 to 3 operates as follows:

Containers 3 with the covers lying loosely thereon are suspended by hand or machine in the openings of conveying plates 7 shortly beyond chain wheel 10 shown at the left. As the plate conveyor moves to the right, the containers with the covers lying thereon are pressed on the side of the cover by fiber rails 8 against metal band 1 which moves in the same direction and at the same speed as the containers. By the heat supplied by heating unit 4 to metal band 1, the brim of the container and the cover are heat-sealed beneath heating unit 4. The sealed containers are then cooled beneath cooling unit 5 which rapidly cools metal band 1. The unobjectionably sealed containers are withdrawn from the conveying plates 7 by hand or machine at the right at the end of the upper part of the plate conveyor.

Figure 4:
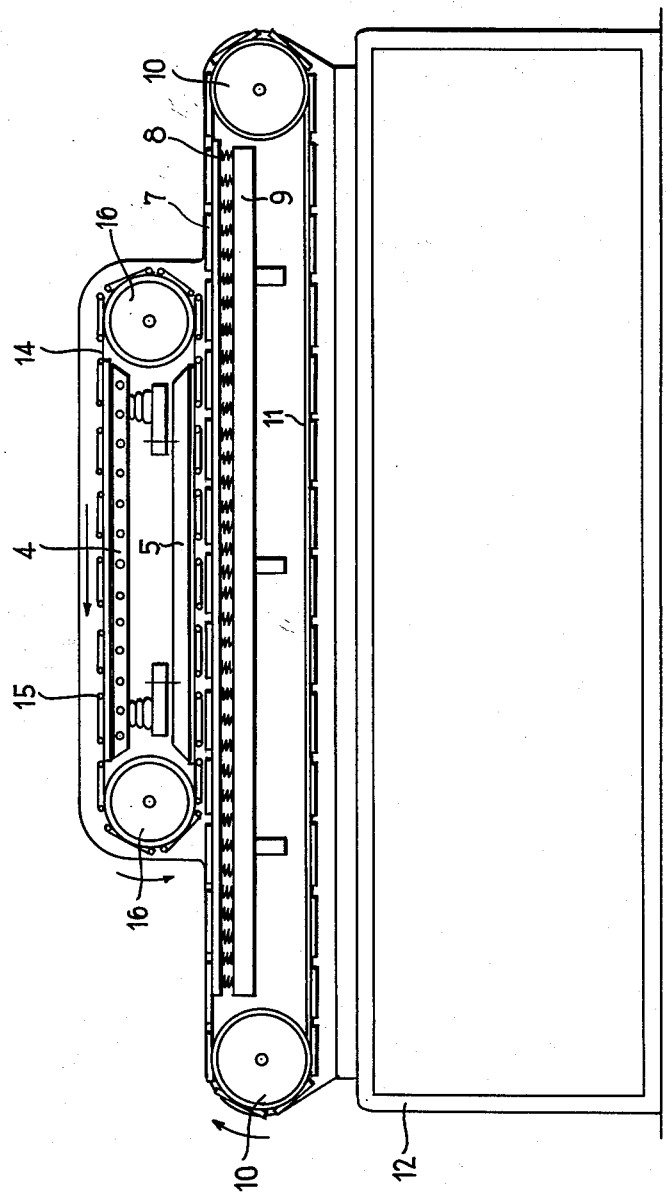
FIGURE 4 is a side view of another embodiment of the invention.
Figure 5:
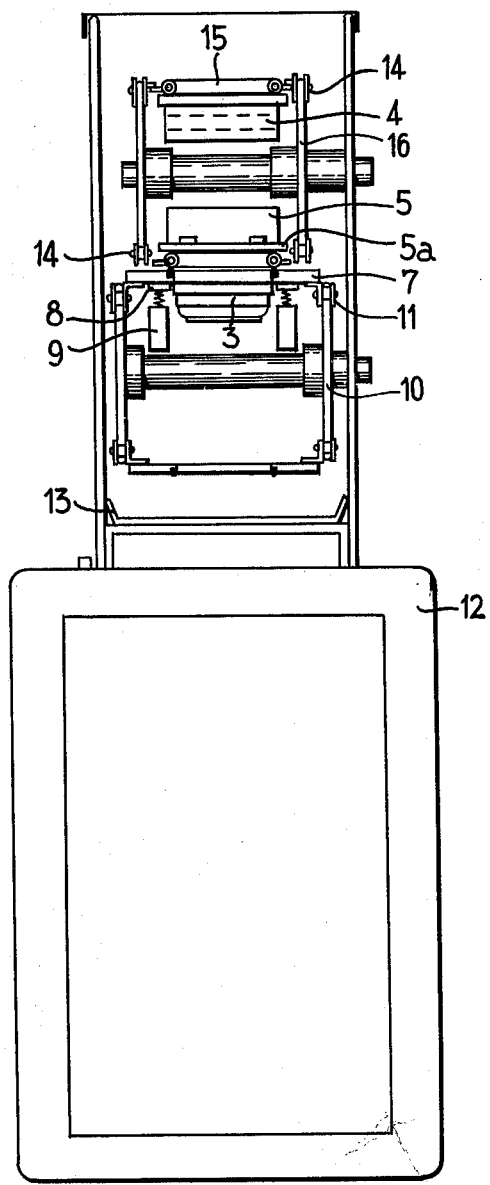
FIGURE 5 is a front end view of the embodiment of FIGURE 4.

FIG. 4 is a side view and FIG. 5 a front view of a closing apparatus in which the engine pedestal 12 and the plate conveyor, including supporting rails 9 and spring-mounted fiber rails 8, are the same as in FIGS. 1 to 3. The endless metal band 1 is replaced, however, by a welding frame conveyor which consists of two endless connecting chains 14 between which welding frames 15 made of copper are suspended and which is driven by chain wheels 16. In this form of construction, heating unit 4 and cooling unit 5 are arranged one above the other, whereby heating unit 4 heats the upper part of the welding frame conveyor below which it is disposed and cooling unit 5 with cooled pressing plate 5a cools the lower part of the welding frame conveyor above which it is disposed.

Figure 6:
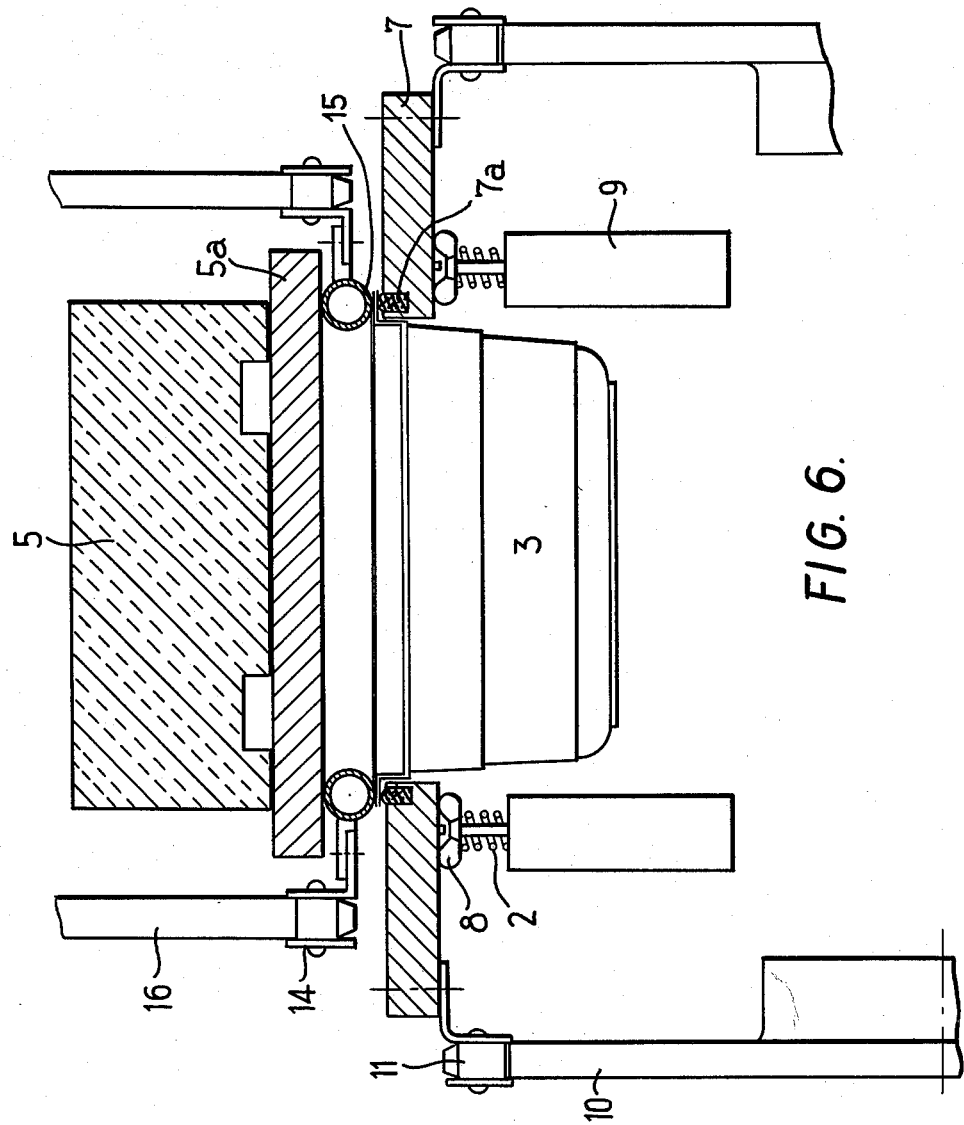
FIGURE 6 is a section on an enlarged scale taken through the cooling unit of FIGURE 4.

FIG. 6 is an enlarged cross-sectional view of a part of the apparatus of FIGS. 4 and 5 and shows the arrangement of cooling unit 5, welding frame 15, the arrangement of container 3 and the spring-mounted supporting device consisting of fiber rails 8, pressure springs 2 and rigid supporting rails 9.

Figure 7:
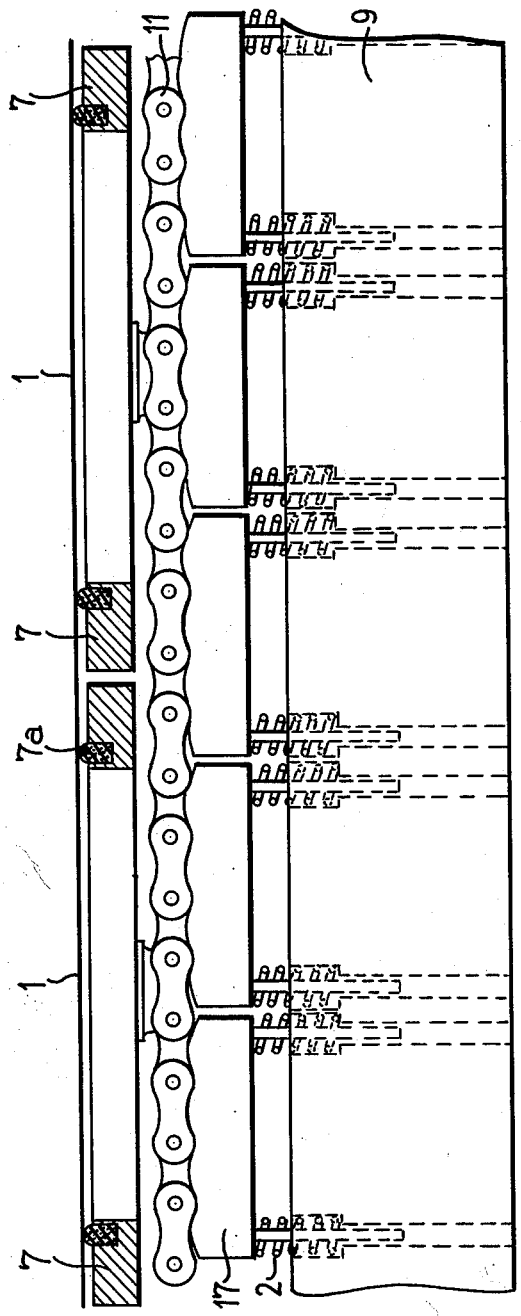
FIGURE 7 is a detail partly in section on an enlarged scale of still another embodiment of the invention.

FIG. 7 is a side view of a part of a constructional form of the apparatus of the invention in which the fiber through-rails 8 shown in FIGS. 1 to 6 are replaced by a plurality of short guide shoes 17 each of which is spring-mounted and which are secured to a supporting through-rail 9 by pressure springs 2.

Figure 8:
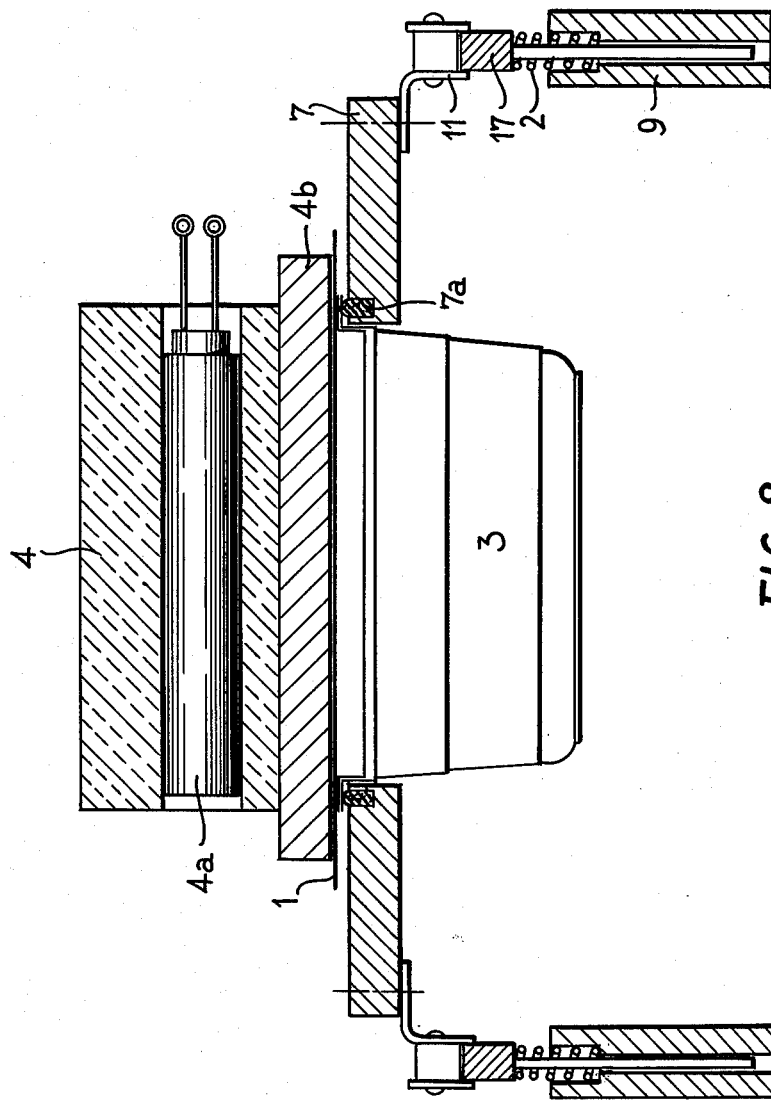
FIGURE 8 is a section similar to FIGURE 3 with the embodiment of FIGURE 7 substituted therein.

FIG. 8 is a cross-sectional view of a part of the apparatus of FIG. 7.

In the apparatus of FIGS. 7 and 8, endless metal band 1 which passes along beneath heating unit 4 comprising heating cartridges 4a and heat contact plate 4b and beneath cooling unit 5 arranged after heating unit 4, forms the contact plane against which the plate conveyor which moves in the same direction as endless metal band 1 and in the conveying plates 7 of which the containers 3 are suspended, is pressed by springs with such pressure that each container with the cover lying thereon is in intimate contact with the metal band over the entire brim of the container so that a perfect contact between the brim and the cover and consequently a perfect weld are obtained. Container 3 is suspended with the brim in the opening of plate 7 of the plate conveyor whose individual plates 7 are linked so as to form an endless belt by chain 11 formed of roller chain links. The plate conveyor slides with the roller chain links over a spring-mounted supporting surface which, in this constructional form of the apparatus, consists of a plurality of short guide shoes 17 each of which is spring-mounted and which are secured by the springs to a supporting through-rail 9.

Figure 9:
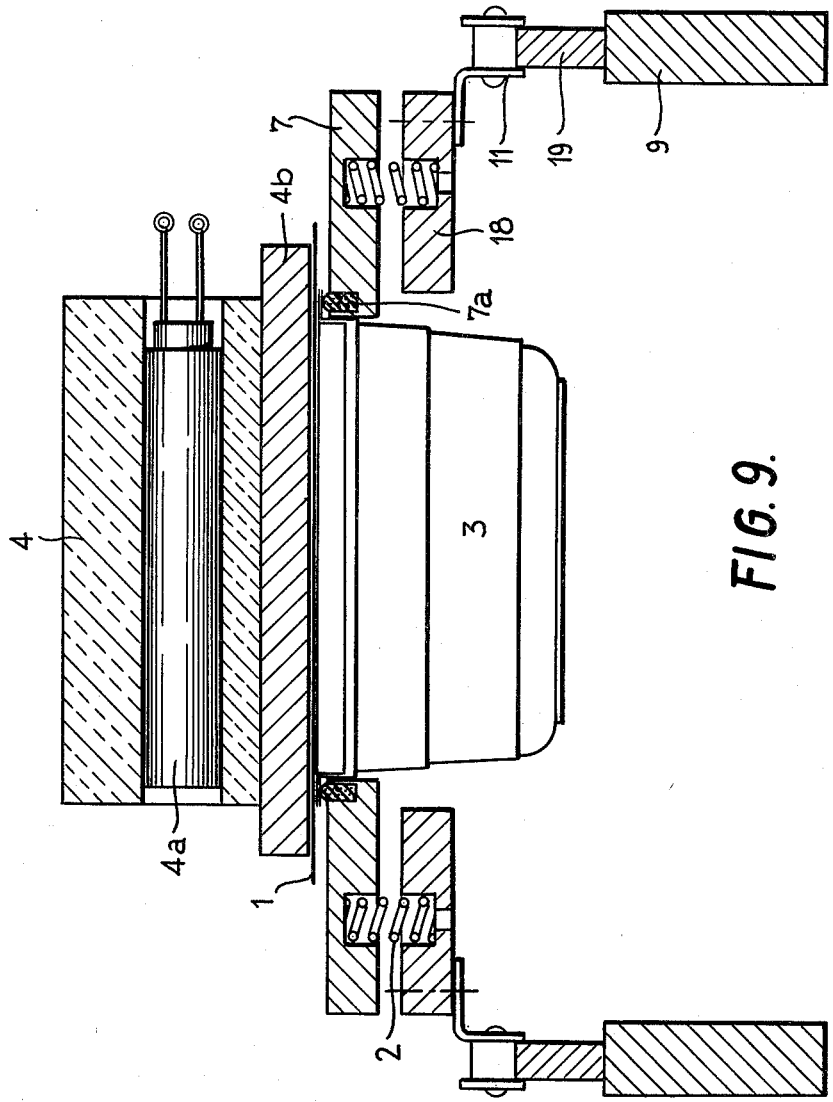
FIGURE 9 is a section similar to FIGURE 8 with a portion of the assembly of FIGURE 8 being substituted by still a further embodiment of the invention.

FIG. 9 is a cross-sectional view of a part of the apparatus of the invention. In FIG. 9, the spring-mounted supporting device of FIGS. 7 and 8 which consists of the individual guide shoes 17 has been replaced by doubling the conveying plates 7 of the plate conveyor by allotting to each conveying plate 7 a base plate 18 on which the conveying plate is mounted by means of a spring 2. Base plates 18 are united by roller chain links 11 to form an endless plate conveyor. Roller chain links 11 slide along the edge of a rigid slide rail 19 which is disposed on a rigid supporting rail 9. This mode of construction ensures that the containers are pressed at the side of the cover particularly uniformly against metal band 1 over the entire length of the apparatus.

The process of the invention and the apparatus for carrying out that process enable containers of thermoplastic material filled, for example, with jam, fish-marinade, or other foodstuffs to be sealed in a manner such that an unobjectionable air-tight weld is obtained over the entire brim of the container.

We claim:
1. An apparatus for continuously closing thermoplastic containers by welding onto the container a thermoplastic cover adapted to the shape of the container which comprises a driven horizontal endless conveyor, a plurality of spaced plates disposed and supported on said conveyor, openings in said plates in which the containers are suspended, a horizontal driven endless metal band which travels above said conveyor in the same direction as the conveyor, a heating unit disposed between the upper and the lower path of the metal band for heating a portion of the metal band as it travels, a cooling unit also disposed between the upper and lower path of the metal band at a point in the band travel beyond said heating unit for cooling a portion of the traveling band, and a spring-mounted supporting device disposed beneath the upper part of the plate conveyor to urge said plate conveyor upwardly whereby the container and cover are in turn urged against both the heated and cooled portion of said band.

2. The apparatus of claim 1 wherein the heating unit and the cooling unit are arranged in the same horizontal plane.

3. The apparatus of claim 1 wherein the heating unit and the cooling unit are arranged one above the other in a manner such that the upper part of the endless metal band is heated by the heating unit and the lower part of the endless metal band is cooled by the cooling unit.

4. The apparatus of claim 1 wherein the spring-mounted supporting device disposed below the upper part of the plate conveyor consists of two fiber rails which are connected over their entire length by means of pressure springs to two rigid supporting rails, the fiber rails pressing the brim of the containers which are suspended in the conveying plates against the lower part of the metal band.

5. The apparatus of claim 1 wherein the spring-mounted supporting device consists of a plurality of separate guide shoes which are arranged horizontally one beside the other and connected to a rigid supporting rail by pressure springs.

6. The apparatus of claim 1 wherein the spring-mounted supporting device consists of a plurality of base plates which are connected, on the one hand, to the lower side of the conveying plates by pressure springs and, on the other hand, directly to the plate conveyor.

7. The apparatus of claim 1 wherein the metal band is replaced by a plate conveyor which consists of two endless conveying chains and a plurality of welding frames which are disposed between the conveying chains and secured to the chain links.

8. The apparatus of claim 1 wherein the conveying plates are provided with rubber supports which are adapted to the shape of the container and on which the brim of the container rests.

References Cited by the Examiner
UNITED STATES PATENTS

| | | | |
|---|---|---|---|
| 2,263,691 | 11/41 | Enkur | 53—39 |
| 2,451,728 | 10/48 | Gardner et al. | |
| 2,492,530 | 12/48 | Kriesheim. | |
| 2,590,379 | 3/52 | Cloud | 53—184 X |
| 2,707,018 | 4/55 | Bolton | 53—188 |
| 3,018,594 | 1/62 | Phillips et al. | 53—373 X |

FRANK E. BAILEY, *Primary Examiner.*

ROBERT A. LEIGHEY, *Examiner.*